US006427811B1

(12) United States Patent
Wedge et al.

(10) Patent No.: US 6,427,811 B1
(45) Date of Patent: Aug. 6, 2002

(54) LOCOMOTIVE PARKING BRAKE

(75) Inventors: Leonard F. Wedge; J. Hunter Babcock, both of Roanoke; Anthony G. Gurley, Troutville; David E. Pettengill, Jr., Salem; Leonid Y. Goldshteyn, Roanoke, all of VA (US)

(73) Assignee: Graham-White Manufacturing Company, Salem, VA (US)

( * ) Notice: Subject to any disclaimer, the term of this patent is extended or adjusted under 35 U.S.C. 154(b) by 0 days.

(21) Appl. No.: 09/705,516

(22) Filed: Nov. 2, 2000

(51) Int. Cl.[7] .............................. B60L 7/00; B61H 13/00
(52) U.S. Cl. ............................ 188/162; 188/34; 303/20
(58) Field of Search ............................ 188/162, 33, 34, 188/29, 57, 3 R, 3 H; 303/7, 20

(56) References Cited

U.S. PATENT DOCUMENTS

| | | | |
|---|---|---|---|
| 1,075,814 A | * 10/1913 | Buda | 188/35 |
| 1,555,831 A | * 10/1925 | Case | 188/36 |
| 3,398,819 A | * 8/1968 | Ruhl et al. | 74/665 T |
| 3,539,038 A | 11/1970 | Taber et al. | |
| 4,931,076 A | 6/1990 | Dampart et al. | |
| 5,178,237 A | 1/1993 | Ursel et al. | |
| 5,180,038 A | 1/1993 | Arnold et al. | |
| 5,219,049 A | 6/1993 | Unterborn | |
| 5,394,137 A | 2/1995 | Orschek | |
| 5,549,363 A | 8/1996 | Kanjo et al. | |
| 5,558,410 A | 9/1996 | Kanjo et al. | |
| 5,558,411 A | 9/1996 | Kanjo et al. | |
| 5,558,412 A | 9/1996 | Kanjo et al. | |
| 5,586,812 A | 12/1996 | Kanjo et al. | |
| 5,593,214 A | 1/1997 | Kanjo et al. | |
| 5,701,974 A | 12/1997 | Kanjo et al. | |
| 5,738,416 A | 4/1998 | Kanjo et al. | |
| 5,827,149 A | 10/1998 | Sponable | |
| 6,039,158 A | * 3/2000 | Fox et al. | 188/162 |

* cited by examiner

Primary Examiner—Paul N. Dickson
Assistant Examiner—Robert A Siconolfi
(74) Attorney, Agent, or Firm—Dority & Manning

(57) ABSTRACT

An electronically controlled parking or safety brake is disclosed. The brake is capable of reliably immobilizing a locomotive. A brake may employ both manual and automatic modes, and be capable of providing for either mode in operation. The electronic control system facilitates the setting and releasing of the brake in the automatic mode without any manual manipulation or readjustment of gears, handles, levers, pawls, and the like being required by an operator. An actuating mechanism is capable of operating in a first mode to set the brake and in a second mode to release the brake. A motor, clutch, gearing means, ratchet mechanism, solenoid, and electronic control system are operatively connected to a chain to set the brake on the locomotive wheel. Further, remote operation of the brake is possible through hard wired control signals or by wireless communication using a transmitter to send signals to the electronic control means. Further, determination of the applied brake force may be through local sensing of motor current or remote sensing through a load sensor located at the wheel braking device.

24 Claims, 11 Drawing Sheets

LOCOMOTIVE PARKING BRAKE

FIELD OF THE INVENTION

This invention is related to braking apparatus, methods, and related systems for large vehicles, such as locomotives. In particular, the invention is directed to electronically controlled parking brake systems that provide a reliable and systematic process for braking such vehicles.

BACKGROUND OF THE INVENTION

Locomotives use parking brakes to ensure that they remain parked, and do not move accidentally when left unattended. In the past, such brakes have been manually set by repeated and forceful pulls upon a lever or handle located on the locomotive. Such prior art braking apparatus have been manually set by a hand-actuated ratchet lever that tensions a brake chain connected to a wheel brake. The wheel brake typically is set when the brake chain applies sufficient tension to the wheel brake. Setting a brake manually is a labor intensive process which requires significant strength and agility to perform properly.

Because of the large amount of force typically required to manually set such brakes, physical injuries or strains may occur when personnel use such manual parking brake systems. Also, train employees must have significant body strength to operate such parking brake systems. If an employee is not strong enough, or has a physical disability, it is generally more difficult for him or her to accomplish the setting of a brake. Further, if an employee is injured in the course of employment, it could be very difficult or impossible for that employee to activate the emergency parking brake system. Further, many small men and women find it impossible to generate enough force to set a brake manually. Without sufficient force applied to the parking brake the locomotive can begin to roll and move out of control down the track. Runaway conditions such as described herein have in the past resulted in serious injury and property damage.

It is advantageous to make it more convenient for an employee to set a train brake. The easier it is to actually set such a brake, the more likely it will be that the brake will be set routinely and properly, thereby reducing the likelihood of accidents. Developments that can save manual steps in the setting or releasing of train brakes are needed to promote the use of such safety parking brake systems at all times, thereby reducing the rate of accidents. Automating the process allows for a more consistent force to be applied each time the brake is operated.

Power assisted train brakes have been used in some applications. For example, U.S. Pat. No. 6,039,158 (the '158 patent) describes a power assisted locomotive parking brake. The brake uses a motor and planetary reduction drive. The system also provides a manual drive that is located between the powered drive and the actuating mechanism. In order to draw up (i.e. set) the brake chain, as described in the '158 patent, the ratchet handle is pulled repeatedly. Further, in order to release the brake, a release handle is pulled to release a ratchet mechanism, thereby facilitating release of the brake.

In determining that a locomotive parking brake is actually set, prior art systems sometimes rely upon visual observations. In other systems, a device has been employed that senses the brake chain position and provides this information to the cab of the locomotive. However, these prior methods of detecting that a brake in fact has been applied in a locomotive are not always reliable. When relying upon visual observation, human error may occur. Further, systems that rely upon the position or take-up length of the brake chain fail to account for situations in which foreign material or debris in the brake chain area improperly causes a false indication that the chain has been applied, when in fact the chain may have malfunctioned. Thus, the chain position may deceive the operator into believing that a proper braking force has been applied to the locomotive wheel, when in fact the correct amount of force has not been applied to the wheel. A system that is capable of more reliably determining when a parking brake has been set by measuring the braking force applied to the wheel, would be highly desirable.

SUMMARY OF THE INVENTION

The invention provides a power driven brake system for a locomotive capable of applying force via the locomotive brake chain to stop rotation of a locomotive wheel and thereby set the parking brake. The actuating mechanism is capable of operating in a first mode to set the brake and in a second mode to release the brake. The mechanism further comprises a motor, a clutch connected to the motor, a gearing mechanism, a ratchet mechanism and a dual acting solenoid connected to the ratchet mechanism. The dual acting solenoid may actually comprise separate solenoid mechanisms, each operating in opposite directions. In other embodiments, the dual acting solenoids may work in tandem. At the output of the gearing mechanism is a sprocket which connects to the locomotive brake chain. The motor, clutch and solenoid are controlled by an electronic control system thereby facilitating the setting and releasing in succession without manual reconfiguration of the actuating mechanism or gearing mechanism.

The apparatus comprises both a manual and an automatic actuatingmechanism, such that both the manual and automatic systems are capable of setting, locking and releasing the brake. The manual actuating mechanism comprises a plurality of gears that are capable of reducing the load required to set the brake such that the amount of force needed to set the brake when operating the lever manually is minimized. In some applications, the force is no more than about 75 lbs. of force.

In other aspects of the invention, a control interface is provided that is capable of sending signals to the actuating mechanism to facilitate locking or releasing the brake remotely, that is, from a location away from the actuating mechanism. The remote control interface may be located on the locomotive, for example in the locomotive cab, or it may be located away from the locomotive, employing a wireless communications device to communicate with the electronics of the actuating mechanism.

Load sensing apparatus is typically provided, with the apparatus being capable of detecting the amount of force applied to the locomotive wheel. The load sensing apparatus transmits an electrical signal to the actuating mechanism indicating to the motor that it should turn off upon reaching a predetermined load threshold, stopping rotation of the chain sprocket. The load sensor may operate by (1) measuring the load applied upon the motor, and (2) in another embodiment may operate by sensing the load applied at the brake itself (which is a more direct measurement of braking force). The electronic control system, when operating in the automatic mode, is capable of reliably indicating when the predetermined force level has been reached.

In another aspect of the invention, a signal is sent back to the locomotive cab as a reliable indication of whether or not the brake is adequately set.

BRIEF DESCRIPTION OF THE DRAWINGS

A full and enabling disclosure of this invention, including the best mode shown to one of ordinary-skill in the art, is set forth in this specification. The following Figures illustrate the invention.

DETAILED DESCRIPTION OF THE INVENTION

Reference now will be made to the embodiments of the invention, one or more examples of which are set forth below. Each example is provided by way of explanation of the invention, not as a limitation of the invention. In fact, it will be apparent to those skilled in the art that various modifications and variations can be made in this invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention, which broader aspect are embodied in the exemplary constructions.

Figure 1:
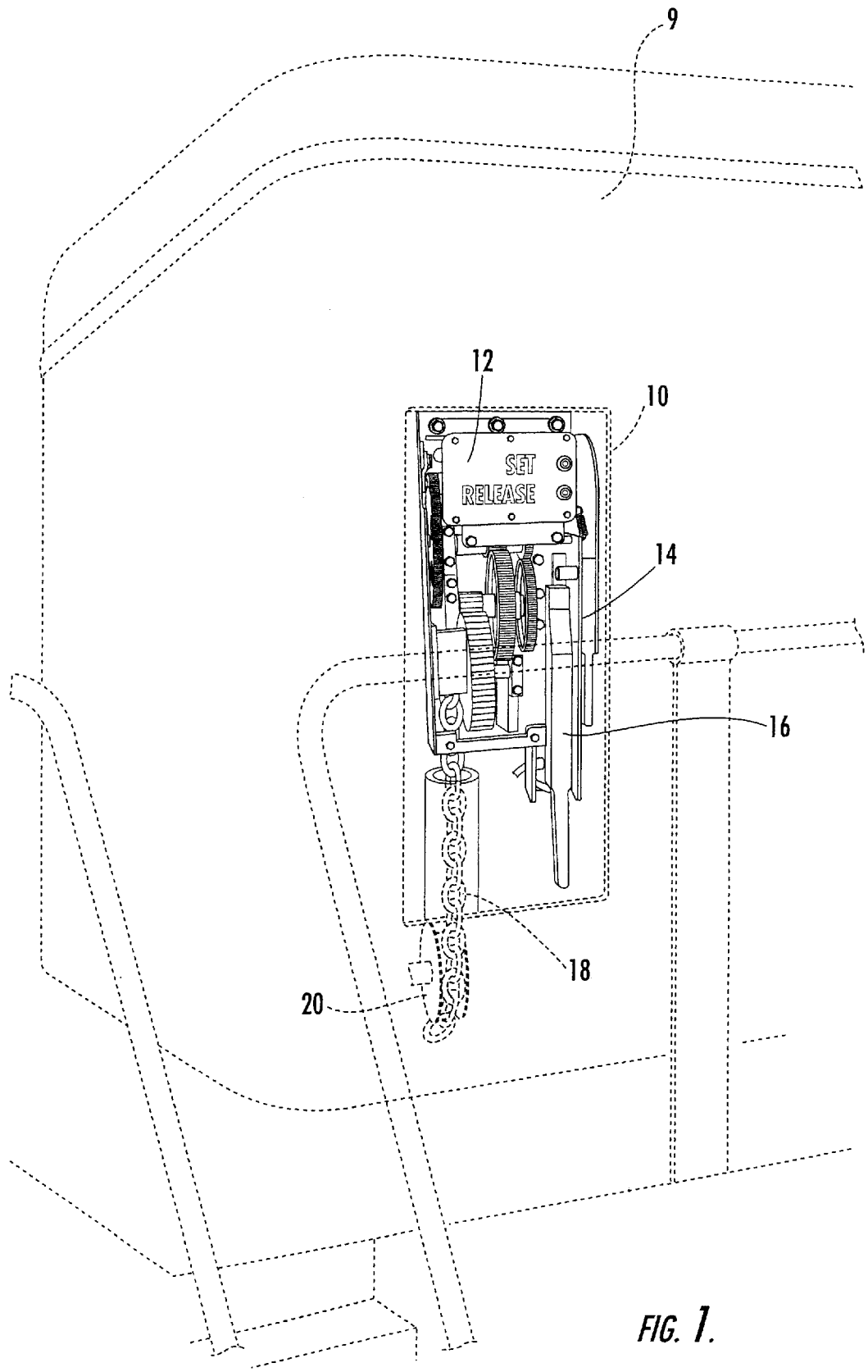
FIG. 1 shows a parking brake unit mounted on the side of a locomotive.

In FIG. 1, locomotive 9 is shown including a parking brake unit 10 mounted for employee access. The parking brake unit 10 comprises a control plate 12 on its upper end, a release lever 14, and a manual application lever 16 along the right side of the parking brake unit 10. Chain 18 runs over sheave 20 in engaging the brake mechanism as described further below.

Figure 2:
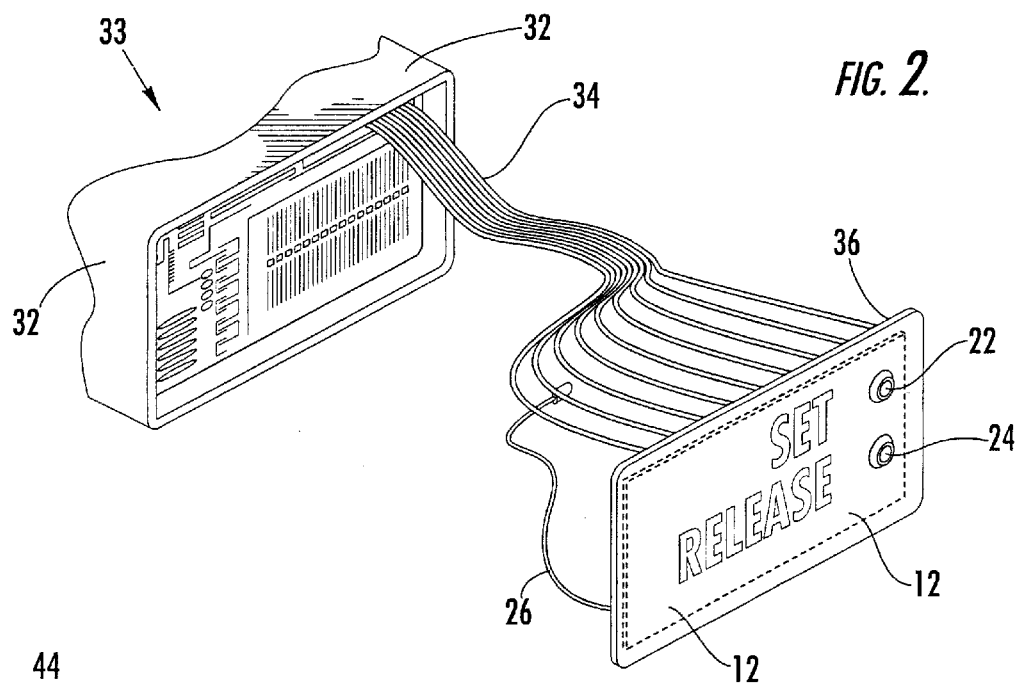
FIG. 2 is an exploded view of a portion of the electronic control system of the invention.

FIG. 2 shows the electronic control system 33 of the invention. FIG. 2 shows a more detailed and exploded view of the control plate 12 which has a set push button 22 and a release control button 24 on its front surface. The control plate also includes a circuit board 36 on its rear, that is not visible in FIG. 2. The set push button is used in the automatic mode to set the parking brake, while the release push button is used in the automatic mode to release the parking brake of the invention.

Figure 3:
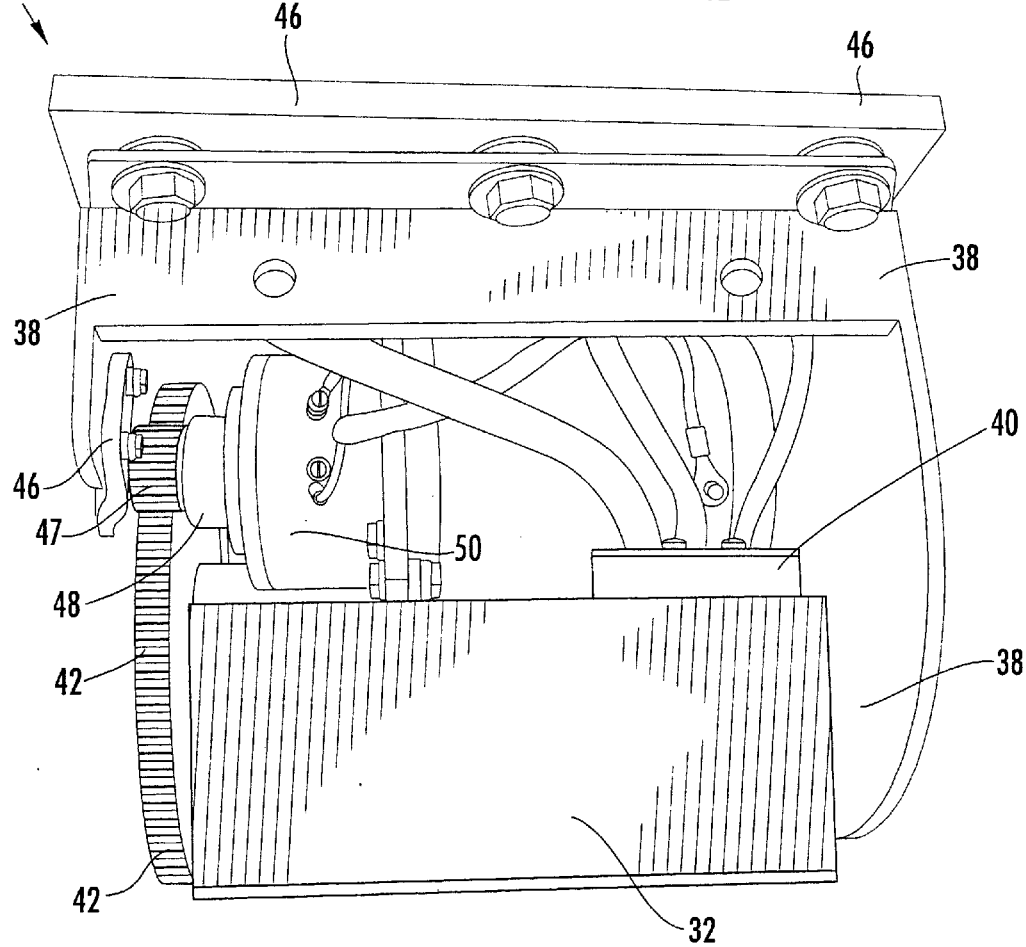
FIG. 3 is a top view of the parking brake unit shown in FIG. 1.

In FIG. 3, the top view of the unit 44 of the parking brake is shown. Electrical cabling exits through grommet 40 on the back of the electrical box 32. The motor 50 is located generally behind the electrical box 32, and it connects by way of friction clutch 48 to pinion gear 47 that is rotatably mounted upon shaft 59 (seen in FIG. 4B). Bearing support 46 is seen at the top of FIG. 3. The pinion gear 47 rotates, thereby turning drive gear 42.

Figure 4A:
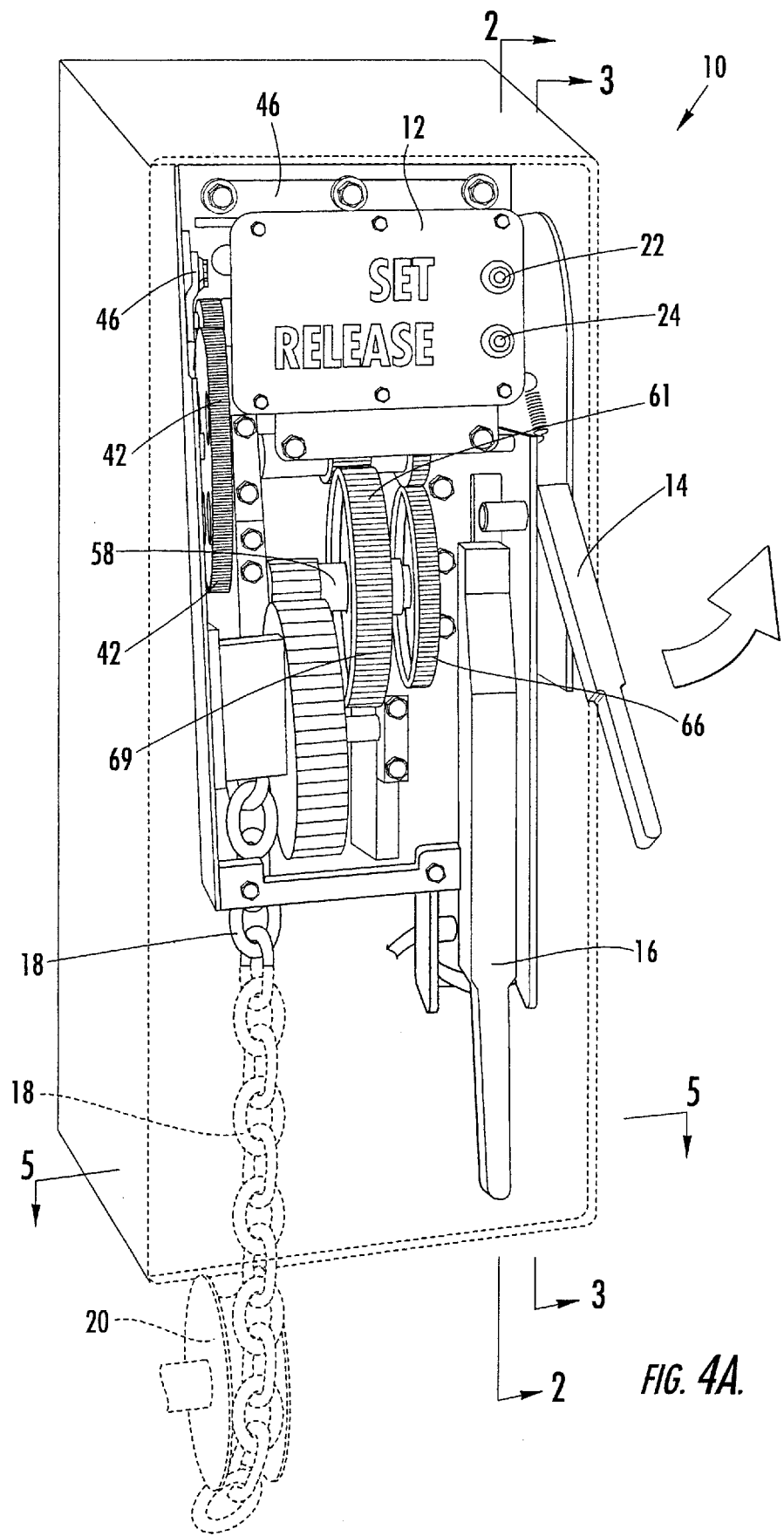
FIG. 4A is a detailed perspective view of the parking brake unit.

FIG. 4A shows a more detailed view of the parking brake unit 10. The control plate 12 is located in the center and top portion of the unit, with the set push button 22 and the release push button 24 provided for ease of use by the operator. Gear 42 is seen at the left side of the unit, and shaft 58 runs horizontally through gear 61 and gear 66. The release lever 14 is shown in the activated or pulled (manual) condition as shown by the arrow on the right side of FIG. 4A. The manual application lever 16 is shown in the release condition within the parking brake unit 10. The chain 18 is seen in the lower left portion of FIG. 4A. The chain 18 and its interaction with the sheave 20 is shown in dashed lines at the lower left of FIG. 4A.

Figure 4B:
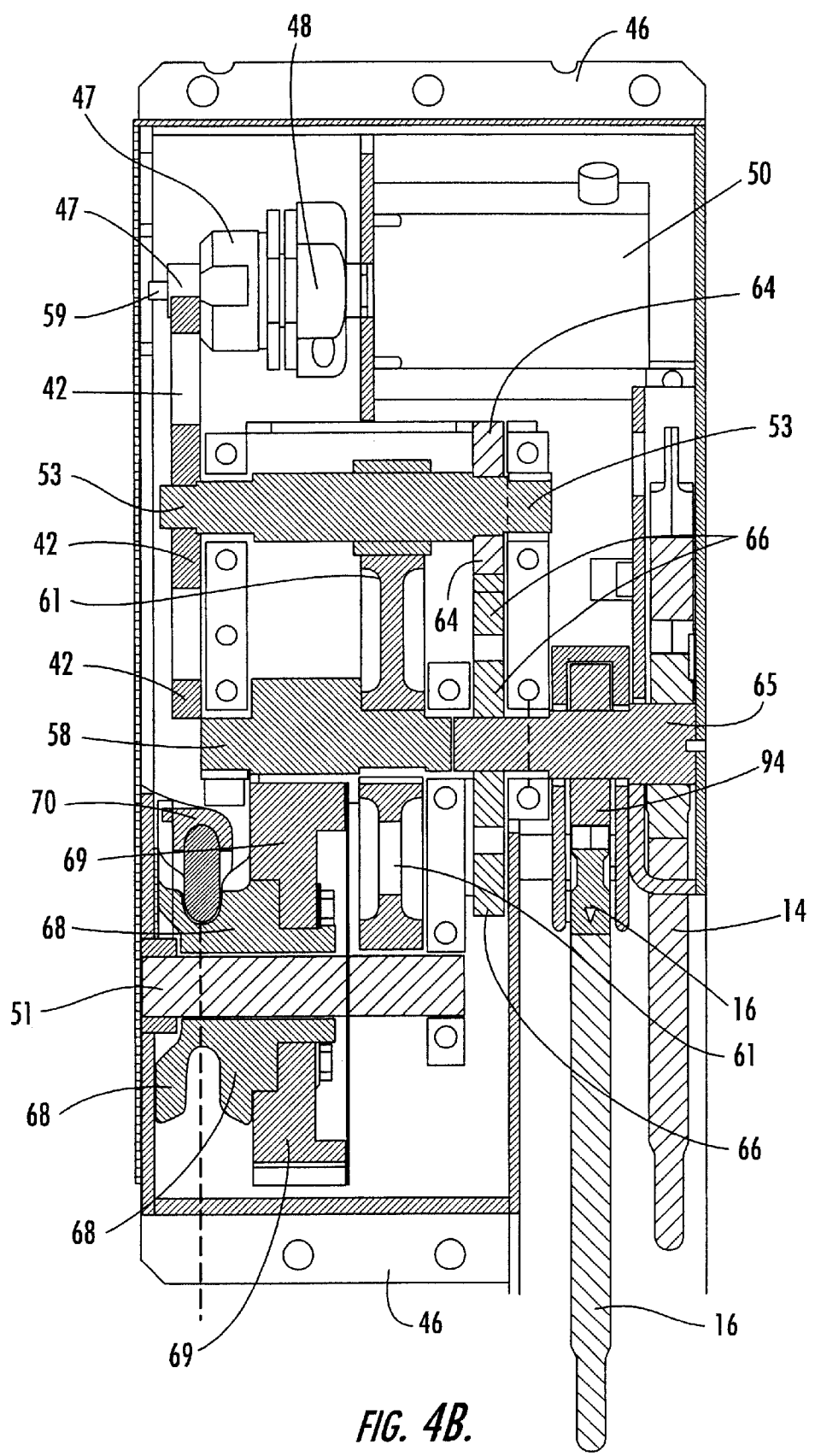
FIG. 4B is a cross-sectional view of the brake interface unit along lines 5—5 of FIG. 4A.

There are two primary methods in which the brake unit may be activated. The first is by an automatic means using set push button 22 or release push button 24. The second is by manual means using the manual application lever 16 and or the release lever 14. The two modes of operation, automatic and manual, proceed along different gearing pathways as shown in FIG. 4B.

In the automatic mode, the motor 50 rotates shaft 59 through a friction clutch 48. A pinion gear 47 is secured to friction clutch 48. Pinion gear 47 rotates gear 42, which in turn rotates shaft 53 which is seen near the center of FIG. 4B. Shaft 53 is operatively engaged to gear 61 which is a large gear near the center of the unit. Gear 61 is secured to a shaft 58 which turns against gear 69. Gear 69 is secured to chain sprocket wheel 68, and when rotated, chain sprocket wheel 68 turns or rotates to lift the chain. The chain 18 (not shown in FIG. 4B) engages chain sprocket 68 and is pulled upward along the dofted line as the chain sprocket rotates. Thus, in the automatic mode there is a substantial gear reduction between the motor and the chain sprocket wheel 68 which is made possible by the gearing means and various shafts of the mechanism.

In the automatic mode, there are five shafts which are rotated: Shaft 65 rotates through engagement with gear 66, which is engaged with gear 64 which is secured to shaft 53. While this portion of the gearing does not affect the application of the load, and the take-up of the chain, it is the portion of the gear train that "holds" the load between strokes in the manual mode, and after the electrical motor is turned off.

Figure 4C:
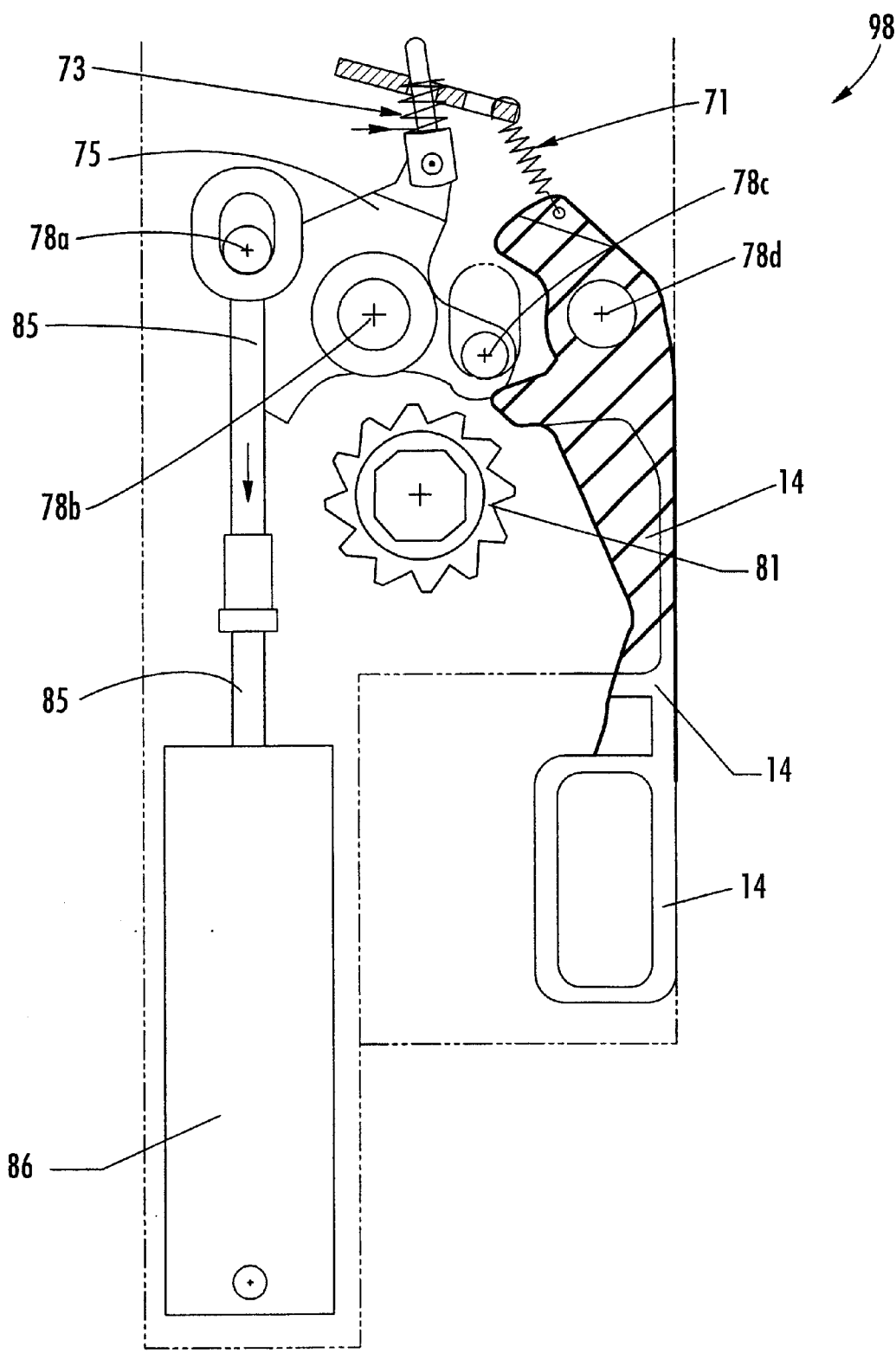
FIG. 4C shows a cross-section of the manual release control of the invention.
Figure 4D:
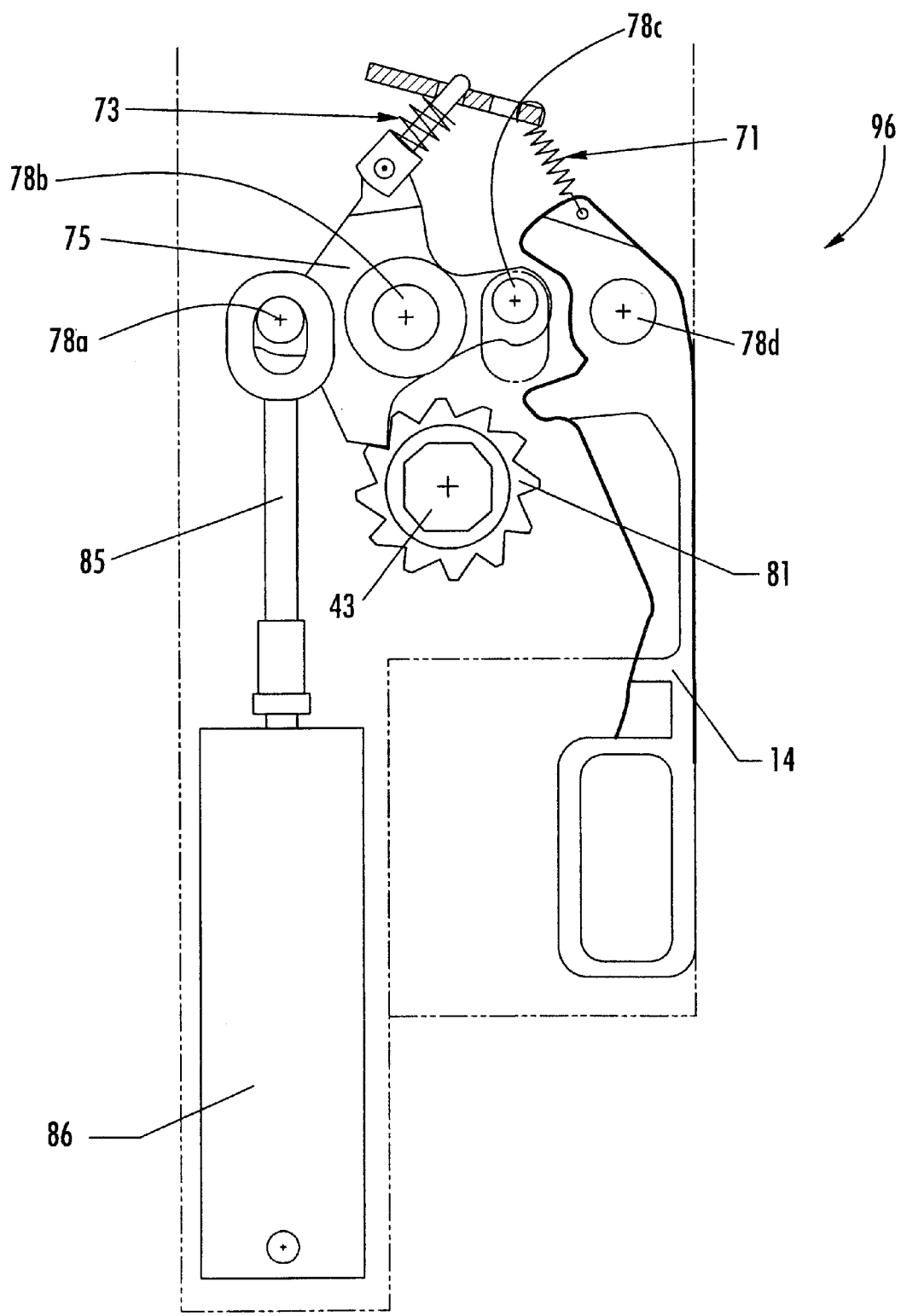
FIG. 4D shows the mechanism of FIG. 4C except that it is shown in the "set" position

In the manual mode of operation, one achieves the "set" position of FIG. 4D by pulling the manual application lever 16 (see FIG. 4E) upwards which engages the top surface of manual application lever 16 against pin 78C which then rotates ratchet pawl 75 engaging ratchet gear 81.

This engagement of ratchet gear 81 and ratchet pawl 75 prevents counter rotation of shaft 43 in the clockwise direction and remainder of gear train under the load introduced into the chain as it is tightened. Overtravel that is built into solenoid 86 and solenoid 85 allow ratchet pawl 75 to rotate shaft 43 to rotate freely in the counter clockwise direction as the brake is being applied. Shaft 65 rotates independently from shaft 58. When shaft 65 is rotated in the manual mode, it supplies power to gear 66 which in turn rotates gear 64. Gear 64 rotates shaft 53, and power is thus transferred from shaft 53 to the chain along the pathway described previously above. A substantial gear reduction is achieved between manual input lever 16 and the chain sprocket wheel 68.

FIG. 4C is a cross sectional view of the actuating mechanism taken along lines 3—3 of FIG. 4A with the actuating mechanism in the release position. That is, in the release position the brake chain is slack, or in a non-tightened mode. The overcenter spring 73 is connected to ratchet pawl 75 near the top of FIG. 4C. Further, the lever return spring 71 engages the end of the release lever 14, and when the release lever is pulled the lever return spring 71 is activated. The ratchet pawl 75 further includes pin 78a which is operatively engaged to rod 85. Rod 85 is reciprocated by a dual action solenoid 86, shown in the lower left portion of FIG. 4C. Ratchet gear 81 is shown in the center of FIG. 4C, and is not engaged by the ratchet pawl when the actuating mechanism is in the release position.

FIG. 4D is a cross sectional view of the actuating mechanism shown along lines 3—3 of FIG. 4A with the actuating mechanism in the set position 96. Ratchet gear 81 is fully engaged by ratchet pawl 75 as shown near the center of the Figure. Pin 78c is in the upper position, and overcenter spring 73 has been deactivated resulting in the engagement of the ratchet pawl 75 with the ratchet gear 81. In the manual mode, one achieves the "set" position of FIG. 4D by pulling the ratchet handle 16 (see FIG. 4E) upwards to activate pin 78c which rotates ratchet pawl 75 causing ratchet pawl 75 to engage into ratchet gear 81. In the automatic mode, the set position of FIG. 4D is achieved by pushing the "set" button 22 shown in FIG. 4 which actuates solenoid 86 as shown in FIG. 4D, causing it to retract rod 85.

This retraction pulls rod 85 causing pin 78a to move downward, thereby pulling ratchet pawl 75 against ratchet gear 81 into engagement as shown in FIG. 4D. In the automatic mode, there is no requirement to manually re-adjust the gearing means in order to switch electronically between the first mode and the second mode.

Figure 4E:
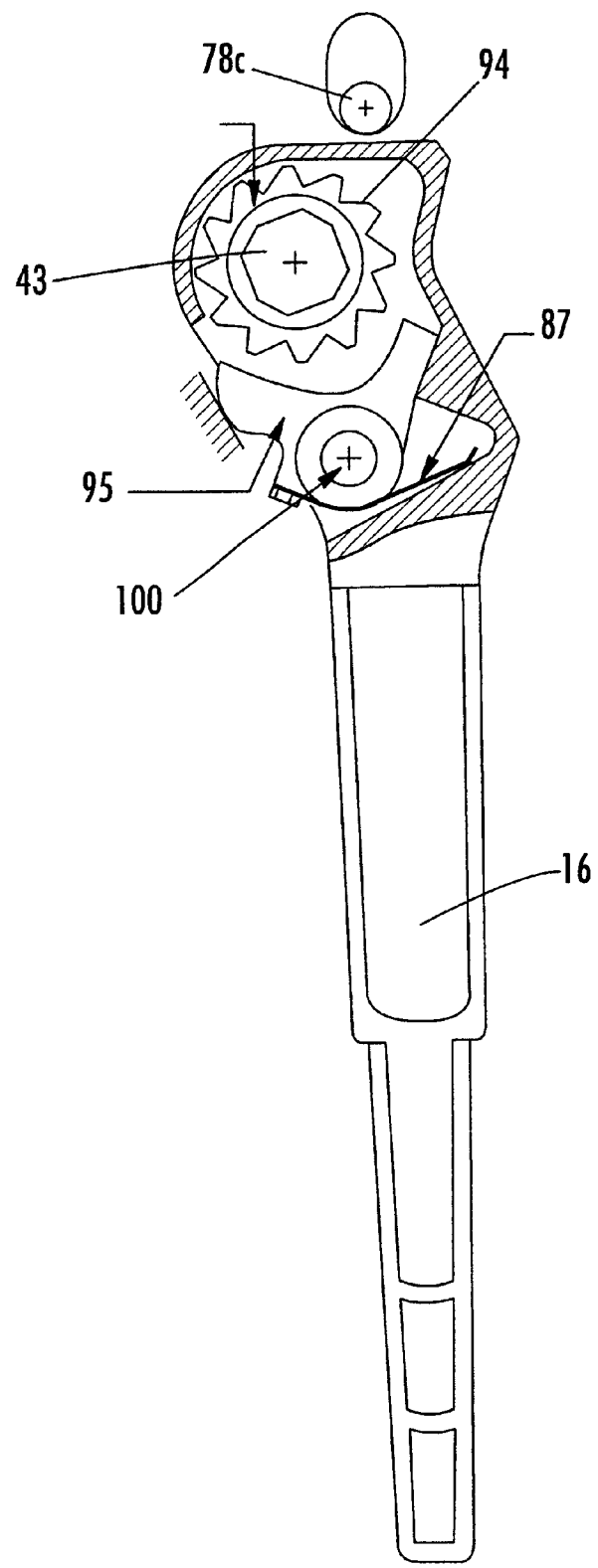
FIG. 4E shows the manual application lever 16 in cross-section along lines 2—2 shown in FIG. 4A.

FIG. 4E shows the manual application lever 16 in the disengaged or "down" position. Pin 78c is in its lowermost position, and there is no engagement shown in FIG. 4E between the handle pawl 95 and the handle ratchet 94. In FIG. 4E, a pin 100 provides a hinged articulation for handle pawl 95. Handle pawl 95 is shown disengaged from handle ratchet 94 in FIG. 4E, but is engaged to handle ratchet 94 in FIG. 4F, as further described below. The pawl return spring 87 functions to return the pawl to its released position as shown in FIG. 4E. FIG. 4E shows the manual application lever 16 in the rest position, while FIG. 4F shows the manual application lever 16 in the rotated position.

Figure 4F:
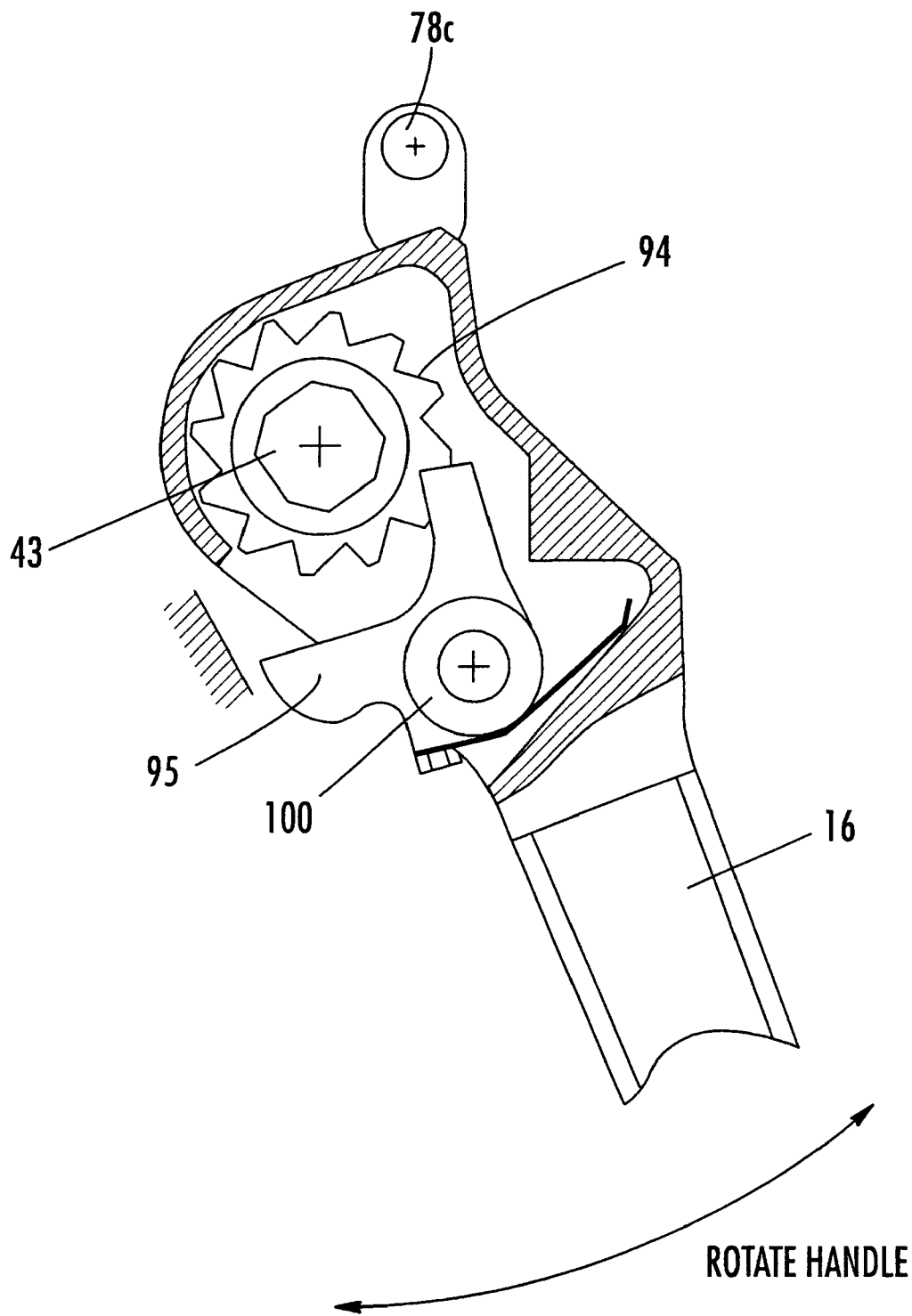
FIG. 4F shows the manual application lever 16 in cross-section along lines 2—2 of FIG. 4A, in manual rotation.

FIG. 4F shows the handle assembly of FIG. 4E in which the handle has been rotated to set the brake. One can see the manual application lever 16 is manually rotated towards the right of the FIG. 4E which causes the handle pawl 95 to engage the handle ratchet 94, thereby also raising pin 78C to its uppermost position as shown at the top of FIG. 4F. Thus, the rotation of the handle as shown in FIG. 4F has the effect of setting the brake. In setting the brake, the pin is rotated upwards to engage the lock. Then, each manual rotation of the manual application lever 16 causes the handle pawl 95 to cam or push against handle ratchet 94 which rotates the gearing and takes up the chain, ultimately resulting in the setting of the brake.

The total number of pulls or reciprocations on the handle required to set the brake is generally in the range of about 25–50 pulls or rotations of the handle. The average amount of force required to rotate the handle is about 35–75 pounds as measured on the distal end of the manual application lever 16. The gear reduction ratio between the output chain and the manual application lever 16 is approximately 11:1, although other gear ratios may be used. In some embodiments, the gear ratio may be as low as about 5:1, but in other alternative embodiments the gear ratio which can be employed may be significantly higher than 11:1, depending upon the specific application.

Figure 5:
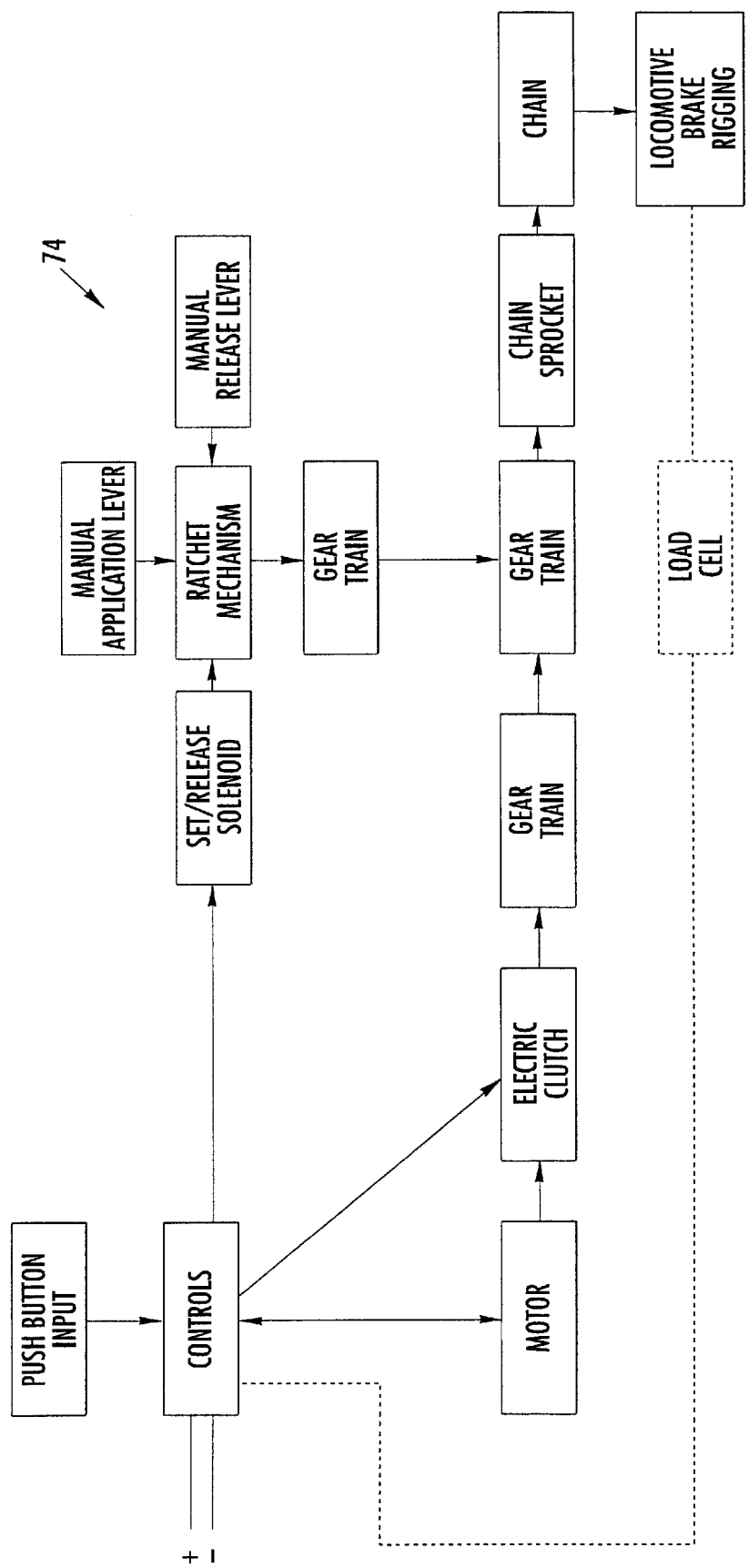
FIG. 5 is a block diagram showing the electronic control system of the invention.

Turning to FIG. 5, a diagram is presented which shows schematically the operation of the electronic control system 74 of the invention. Pushbuttons are provided on control panel 12 as previously described, and the controls provide direct output to the motor, clutch and solenoid for set and release operation. Further, load information is provided to the control system via motor current feedback or load cell feedback. Further, the control system provides feedback to the motor as shown in the lower left portion of FIG. 5. When operating in the manual mode of the invention, the manual application lever is used to engage the lock mechanism and apply a load through the gear train which provides power into the chain and to the locomotive brake rigging. A gear reduction is achieved, and further, the gear train mechanism is engaged which results in the pulling of the chain that activates the locomotive brake rigging as shown in the lower right portion of FIG. 5. A manual release lever is used to disengage the mechanical lock which releases the parking brake.

The actuating mechanism is capable of electronically switching between a first mode to set the brake and a second mode to release the brake without any manual readjustment of the gearing means being required. That is, in prior art devices, it sometimes is common that an operator be required to manually pull the manual application lever 16 before operating the brake system, even when operating in an "automatic" mode. Likewise, in some prior art devices, it would be required to manually pull the release lever 14 prior to using the automatic release mode of the brake. Using the electronic control system of the present invention, it is possible to avoid manually pulling levers to engage and release the brake when operating the parking brake system in the automatic mode.

It is possible to operate the emergency parking brake system of this invention without a human operator being present at the parking brake, in part, because there is no requirement that the levers be manually pulled by an employee for engaging or releasing the brake in the automatic mode. This is further discussed below in connection with FIG. 7. The invention provides for a dual action solenoid 86 which may include two solenoid units operating in tandem that are each connected to rod 85 as shown in FIGS. 4C and 4D wherein one solenoid pulls the rod, while the other solenoid pushes the rod. This provides for "dual" action.

Further, in FIG. 5 an optional load cell is shown in dotted lines. The load cell may provide for a feedback control that facilitates the measurement of the actual load applied at the brake shoe to control the set point of the brake. The load cell facilitates the determination of when the proper load has been applied and is a reliable indication of proper brake application because it is measured at the wheel instead of at the chain. A load cell provides feedback to a controller as to the degree of load applied to the wheel itself, using electronic procedures as known by a person of skill in the art. This signal is interpreted by the controller, and when the appropriate load has been applied the controller stops the motor, limiting the load in the braking system. It should also be emphasized that the load must be both applied and held for periods of time. Thus, the load is prevented from causing backwards rotation in the invention. The dual acting solenoid is the device that is capable of actuating and releasing the holding mechanism, and also allows the load to be applied through the gear train.

Figure 6:
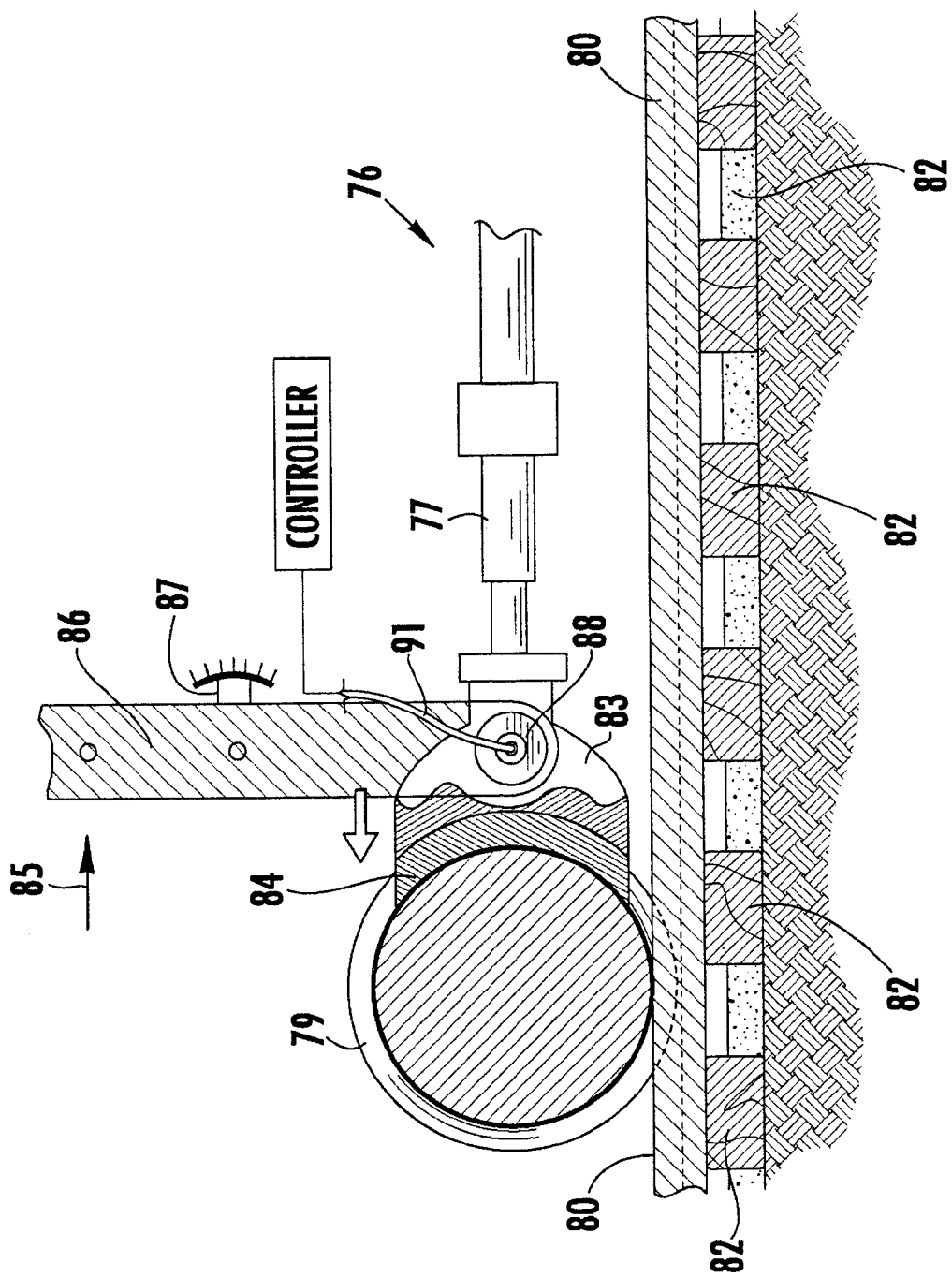
FIG. 6 illustrates the brake rigging at a wheel of the locomotive.

In FIG. 6, a wheel braking device 76 is shown which includes an optional controller that interacts with wire 91 and load cell sensor 88. The chain of the brake system runs from the parking brake unit 10 as shown in FIG. 1 and provides pushing action on brake shoe 84. In the invention, almost any linking means may be used to operably connect the wheel braking device with the gearing means to facilitate the setting and releasing of the wheel braking device. In one embodiment, a chain or shaft 77 pulls on brake head 83, which transmits force to brake lever 86. The direction of applied brake force is shown by arrow 85. This results in power applied to brake shoe 84. Other linking means could be used with the apparatus of the invention. This provides braking action to the locomotive wheel 79 as it rests upon rail 80 of rail bed 82. In one optional embodiment of the invention, the actual force applied at the brake shoe 84 may be measured, and signals representing that force may be transmitted along wire 91 to the controller. The electronic control system of the invention is capable of accurately and reliably determining that in fact the emergency brake is set and operating properly.

Several different embodiments of the invention are possible. For example, at least two different methods may be used to control when the brake application is complete. One method senses the current draw of the motor as an indication of the applied load. In this first method, the measurement is made of the load applied to the chain. In a second method, a feedback control loop (signal) from a load cell in the brake head itself, or other location, can be used to notify electronically that the brake in fact has been set correctly.

Figure 7:
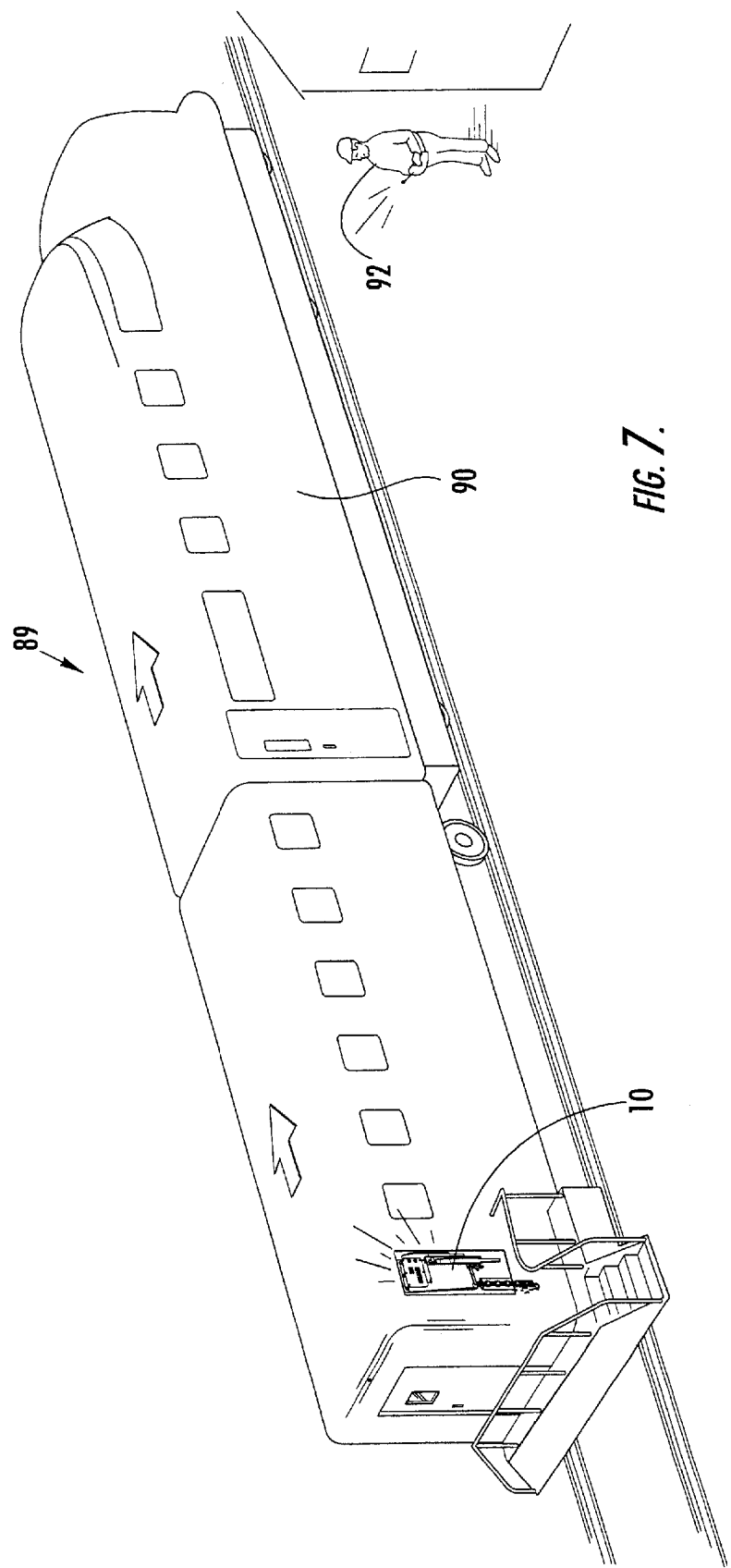
FIG. 7 shows one alternative embodiment of the invention that employs a wireless communications device to enable the set and release of the parking brake remotely.

In FIG. 7, one optional embodiment of the invention is shown in which a remotely operated brake system 89 is employed. Locomotive 90 is secured by the emergency parking brake system by an operator 92 using a wireless communication device. The wireless communication device could be most any device capable of providing signals through the air that are received and interpreted by the electronic control system of the parking brake unit 10 shown on the left side of FIG. 7. The use of a dual solenoid results in no need to re-set the gearing. That is, the fact that there is no need to manually re-set the gearing makes remote operation as shown in FIG. 7 possible. Such transmitter devices are known by persons of skill in the art of transmitting signals in a wireless mode. In this optional embodiment, it is possible for the operator 92 to engage or disengage the emergency parking brake system remotely using a hand held device or an electronic control within a pack secured on his or her body.

In still another embodiment of the invention, the parking brake system could be activated by a control panel in another portion of the locomotive, remote from the brake interface unit 10. This application would use electrical cabling in the locomotive to locate a remote control panel (not shown) in a convenient location for operation, such as in the cab of the locomotive. This particular application of the invention would be remote to the parking brake unit 10, but would not necessarily be wireless.

In the electronic control system of the invention, numerous different methods may be used to connect an electronic powered circuit board 36 to the control plate 12 as shown in FIG. 2. The invention is not limited to the electronic control system shown in this application, but contemplates any electronic control system capable of performing the function shown in this disclosure. Each pushbutton may be equipped with an indicator light which is independently controlled by logic readily available to persons of skill in the art. Indicator lights may be used to signal various modes of operation of the parking brake.

It is understood by one of ordinary skill in the art that the present discussion is a description of exemplary embodiments only, and is not intended as limiting the broader aspects of the present invention, which broader aspects are embodied in the exemplary constructions. The invention is shown by example in the appended claims.

What is claimed is:

1. A power driven brake system for a locomotive, comprising
   (a) a wheel braking device capable of applying direct force to prevent rotation of a locomotive wheel and thereby set a brake;
   (b) an actuating mechanism for setting and releasing the wheel braking device, the actuating mechanism being capable of operating in a first mode to set the brake and in a second mode to release the brake, said mechanism further comprising:
       i) a motor,
       ii) a clutch,
       iii) a gearing means; and
       iv) an electronic control system;
   (c) a linking means, the linking means operably connecting the wheel braking device with the actuating mechanism to facilitate setting and releasing the wheel braking device; and
   (d) wherein the actuating mechanism is capable of electronically switching between the first mode and the second mode to set and release the brake without manual re-adjustment of the gearing means.

2. The system of claim 1 in which the actuating mechanism is operated by contacting an electronic control panel.

3. The system of claim 1 in which the actuating mechanism is operated remotely by sending signals from a communication device.

4. A power driven brake system for a locomotive that is adapted for electronic control, comprising
   (a) a wheel braking device capable of applying direct force to prevent rotation of a locomotive wheel and thereby set a brake;
   (b) an actuating mechanism comprising a dual acting solenoid for setting and releasing the wheel braking device, the dual acting solenoid being capable of operating in a first mode to set the brake and in a second mode to release the brake, said actuating mechanism further comprising:
       i) a motor,
       ii) a clutch,
       iii) a gearing means; and
       iv) an electronic control system;
   (c) a linking means, the linking means operably connecting the wheel braking device with the actuating mechanism to facilitate setting and releasing the wheel braking device; and
   (d) wherein the dual acting solenoid is under the control of the electronic control system and is therefore capable of electronically switching between the first mode and the second mode to set and release the brake without manual re-adjustment of the gearing means.

5. The system of claim 1 in which the brake system further comprises:

(e) a load sensor connected to the wheel braking device, the load sensor being capable of detecting the amount of force applied to the locomotive wheel and transmitting signals representing the force load level.

6. The system of claim 5 in which the actuating mechanism is capable of setting the brake based on signals indicating that a predetermined load threshold has been reached.

7. A safety brake apparatus, comprising:

(a) a wheel braking device capable of applying force to immobilize a locomotive wheel;

(b) an electronically controlled actuating mechanism for setting and releasing the wheel braking device from the wheel, the actuating mechanism being capable of operating in a first mode to lock the brake and in a second mode to release the brake, said actuating mechanism further comprising a motor, a clutch connected to the motor, and a gearing mechanism, further wherein an electronic control system is provided to direct the onset of the first mode or the second mode, the electronic control system further comprising at least one solenoid that is capable of electronically switching between the first mode and the second mode, thereby facilitating the locking and releasing of the brake in succession without manual re-configuration of the gearing mechanism; and (c) a linking means, the linking means operably connecting the wheel braking device with the gearing means to facilitate setting the wheel braking device.

8. The apparatus of claim 7 additionally comprising:

(d) a load sensor, the load sensor being capable of detecting the amount of force being applied and transmitting electrical signals representing the force load level to electronic control system of the actuating mechanism.

9. The apparatus of claim 8 further wherein the load sensor is operatively connected to the motor.

10. The apparatus of claim 8 wherein the load sensor is operatively connected to the wheel braking device.

11. The apparatus of claim 7 further comprising:

(d) a communications device capable of sending signals to the electronic control system to facilitate locking or releasing the brake remotely.

12. The apparatus of claim 11 wherein a human operator carries the communications device, the device being capable of transmitting signals to the actuating mechanism to lock or release the brake.

13. The apparatus of claim 7 further wherein the electronic control system is capable of measuring or receiving date representing the degree of load being applied to the locomotive wheel.

14. The apparatus of claim 7 further comprising:

a manual actuating mechanism comprising levers, ratchets and gears wherein movement of a first lever locks the brake, and movement of a second lever releases the brake.

15. The apparatus of claim 14 wherein the manual actuating mechanism and the electronic control system are both capable of locking and releasing the brake.

16. The apparatus of claim 7 in which the electronically controlled actuating mechanism is capable of providing a low or high voltage lockout.

17. The apparatus of claim 7 in which the linking means comprises a chain.

18. The apparatus of claim 14 in which said gearing means comprises a plurality of gears that are capable of reducing the load required to set the brake such that the amount of force needed to set the brake when operating the lever manually is no more than about 75 lbs of force.

19. The apparatus of claim 18 in which the gearing means comprises a three gear configuration.

20. A method of using a safety brake on a locomotive, comprising:

(a) providing a wheel braking device capable of applying force to immobilize a locomotive wheel;

(b) providing an electronically controlled actuating mechanism, said actuating mechanism further comprising a motor, a clutch connected to the motor, and a gearing mechanism, further wherein an electronic control system is provided to engage or disengage the brake, the electronic control system further comprising a solenoid that is capable of electronically switching between a first mode for locking the brake and a second mode for releasing the brake;

(c) providing a linking means operably connected between the actuating mechanism and the wheel braking device;

(d) transmitting signals from the electronic control system to the motor;

(e) transferring energy from the motor through the linking means to the wheel braking device; and (f) applying force to set the brake, thereby rendering the locomotive substantially immobile.

21. The method of claim 20 further comprising a load cell feedback control loop that is capable of measuring the load actually being applied at the wheel braking device, such that the value of said load as measured may be used to determine the set point of the brake in the electronic control system.

22. The method of claim 21 further comprising the following step:

(g) applying force to release the brake without manually adjusting or re-adjusting the gearing means.

23. The method of claim 22 further comprising the following step:

(h) applying force to set the brake a second time without manually adjusting the gearing means.

24. The method of claim 23 additionally comprising a dual acting solenoid, the solenoid being capable of operating in a first mode to set the brake and in a second mode to release the brake.

* * * * *

(12) EX PARTE REEXAMINATION CERTIFICATE (6233rd)
United States Patent
Wedge et al.

(10) Number: US 6,427,811 C1
(45) Certificate Issued: May 20, 2008

(54) LOCOMOTIVE PARKING BRAKE

(75) Inventors: Leonard F. Wedge, Roanoke, VA (US); J. Hunter Babcock, Roanoke, VA (US); Anthony G. Gurley, Troutville, VA (US); David E. Pettengill, Jr., Salem, VA (US); Leonid Y. Goldshteyn, Roanoke, VA (US)

(73) Assignee: Graham-White Mfg. Co., Salem, VA (US)

Reexamination Request:
No. 90/007,954, Mar. 2, 2006

Reexamination Certificate for:
Patent No.: 6,427,811
Issued: Aug. 6, 2002
Appl. No.: 09/705,516
Filed: Nov. 2, 2000

(51) Int. Cl.
*B61H 13/00* (2006.01)
*B60L 7/00* (2006.01)

(52) U.S. Cl. .............. 188/162; 188/34; 303/20
(58) Field of Classification Search ........... 188/162, 188/34, 29, 57, 3 R, 3 H; 303/3, 7, 9, 15, 303/20, 16
See application file for complete search history.

(56) References Cited

U.S. PATENT DOCUMENTS

| | | |
|---|---|---|
| 829,032 A | 8/1906 | Pfingst |
| 4,546,298 A | 10/1985 | Wickham et al. |
| 4,892,014 A | 1/1990 | Morell et al. |
| 5,180,038 A | 1/1993 | Arnold et al. |
| 5,593,214 A | 1/1997 | Kanjo et al. |
| 5,620,077 A | 4/1997 | Richard |
| 5,738,416 A | 4/1998 | Kanjo et al. |
| 6,039,158 A | 3/2000 | Fox et al. |
| 6,244,394 B1 | 6/2001 | Gutierrez et al. |
| 6,249,737 B1 | 6/2001 | Zipp |

FOREIGN PATENT DOCUMENTS

GB 2141501 A 12/1984

*Primary Examiner*—Matthew C. Graham

(57) ABSTRACT

An electronically controlled parking or safety brake is disclosed. The brake is capable of reliably immobilizing a locomotive. A brake may employ both manual and automatic modes, and be capable of providing for either mode in operation. The electronic control system facilitates the setting and releasing of the brake in the automatic mode without any manual manipulation or readjustment of gears, handles, levers, pawls, and the like being required by an operator. An actuating mechanism is capable of operating in a first mode to set the brake and in a second mode to release the brake. A motor, clutch, gearing means, ratchet mechanism, solenoid, and electronic control system are operatively connected to a chain to set the brake on the locomotive wheel. Further, remote operation of the brake is possible through hard wired control signals or by wireless communication using a transmitter to send signals to the electronic control means. Further, determination of the applied brake force may be through local sensing of motor current or remote sensing through a load sensor located at the wheel braking device.

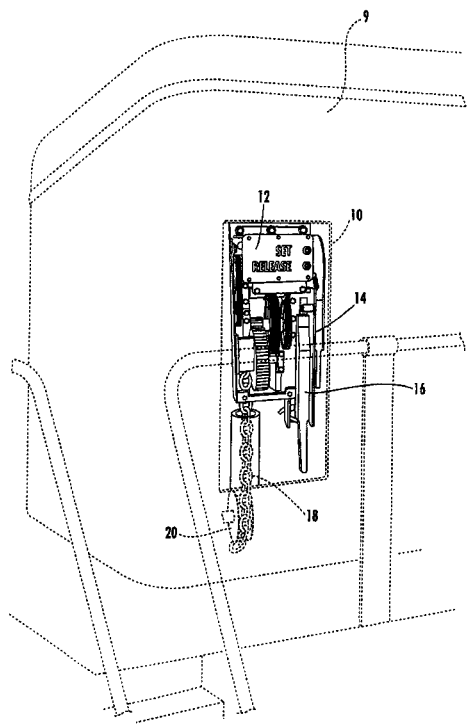

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–24 is confirmed.

New claims 25–35 are added and determined to be patentable.

25. *A power driven brake system for a locomotive, comprising*
   *(a) a wheel braking device capable of applying direct force to prevent rotation of a locomotive wheel and thereby set a brake;*
   *(b) an actuating mechanism for setting and releasing said wheel braking device, said actuating mechanism being capable of operating in a first mode to set the brake and in a second mode to release the brake, said mechanism comprising:*
      *i) a motor that provides motive force for setting said wheel braking device,*
      *ii) a clutch and gearing means operably configured with said motor to apply rotational drive of said motor to set said wheel braking device; and*
      *iii) an electronic control system;*
   *(c) a linking means operably connecting said wheel braking device with said actuating mechanism to facilitate setting and releasing said wheel braking device; and*
   *(d) wherein said actuating mechanism is capable of electronically switching between the first mode and the second mode to set and release the brake without manual re-adjustment of said gearing means.*

26. *The power driven brake system of claim 25, wherein said clutch is configured between said motor and said gearing means.*

27. *The power driven brake system of claim 25, wherein said clutch is an electric clutch.*

28. *The power driven brake system of claim 25, further comprising a load sensor configured to detect the amount of force applied to the locomotive wheel and transmitting signals representing the force load level.*

29. *The power driven brake system of claim 28, wherein said load sensor is configured to sense current draw of said motor.*

30. *The power driven brake system of claim 28, wherein said load sensor is operatively connected to said wheel braking device.*

31. *The power driven brake system of claim 25, further comprising a ratchet gear releasably coupled to said gearing means to prevent rotation of said gearing means in one direction.*

32. *The power driven brake system of claim 25, wherein said electronic control system comprises a circuit board.*

33. *The power driven brake system of claim 25, wherein said actuating mechanism comprises a solenoid capable of electronically switching between the first mode and the second mode to facilitate setting and releasing said wheel braking device.*

34. *The power driven brake system of claim 25, further comprising a manual actuating mechanism configured for setting and releasing said wheel braking device in a manual mode.*

35. *The power driven brake system of claim 25, wherein said clutch comprises a friction clutch.*

\* \* \* \* \*